May 29, 1923.

N. W. STORER

COUPLER

Filed Oct. 11, 1922

1,456,945

WITNESSES:
C. N. Cochran
W. B. Jaspert.

INVENTOR
Norman W. Storer.
BY
Wesley G. Carr
ATTORNEY

Patented May 29, 1923.

1,456,945

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

COUPLER.

Application filed October 11, 1922. Serial No. 593,680.

*To all whom it may concern:*

Be it known that I, NORMAN W. STORER, a citizen of the United States, and a resident of Pittsburgh, in the county of Allegheny and State of Pennsylvania, have invented a new and useful Improvement in Couplers, of which the following is a specification.

My invention relates to railway-vehicle trucks, more especially to hinge constructions therefor which will permit freedom of articulation between the respective truck members constituting the body support.

It is among the objects of this invention to provide a yielding and flexible connection between articulated trucks of locomotives to prevent excessive stressing and nosing of the members and to assist in guiding on curves.

It is a further object of my invention to provide a structure which shall be simple in design, mechanically strong and efficient in operation.

My present invention is directed to a hinge structure for providing freedom of articulation between truck members which comprises a plurality of co-operating bumpers connected by a plurality of links pivotally mounted thereon and adapted to provide relative longitudinal movement therebetween. A transverse link, pivotally mounted at its respective ends to projecting supports associated with the bumpers, permits of pivotal movement between the bumpers but is adapted to restrain relative lateral movement therebetween.

Figure 1:
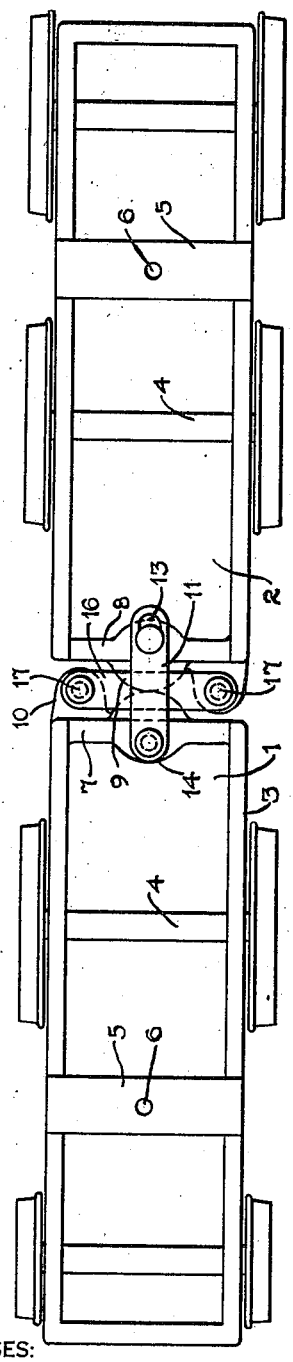
Figure 2:
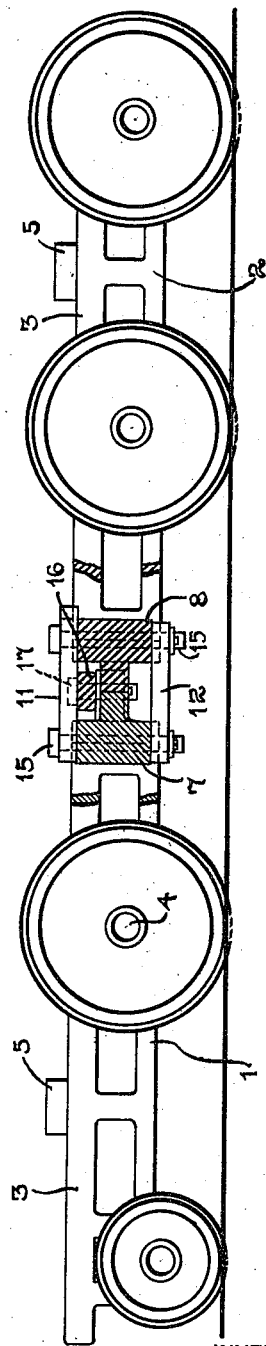

In the accompanying drawing constituting a part hereof and in which like reference characters designate like parts, Figure 1 is a plan view of a pair of trucks hinged in accordance with this invention; and Fig. 2 is a side elevational view thereof, partially in cross section.

The structure comprises a pair of trucks 1 and 2 having the usual side frames 3 which are journaled to a plurality of axles 4 in the usual manner. The trucks are provided with cross center-bearing plates 5 provided with openings 6 adapted to receive center pins of the locomotive body to provide pivotal movement of the trucks. The adjacent ends 7 and 8 of the trucks 1 and 2, respectively, are provided with convex projecting bumpers 9 and projecting supporting brackets 10. A plurality of links 11 and 12, each provided with an elongated opening 13 and an annular opening 14, are pivotally mounted at their respective ends on the bumpers 9 by through bolts 15. A transverse link 16 is pivotally connected, at its respective ends, to the projecting brackets 10 by suitable bolts 17.

The operation of the hinge is briefly as follows. When employed on pusher locomotives, the bumpers 9 are in contact and the trucks 1 and 2 pivot about the convex surfaces thereof to permit guiding action of the fore truck when rounding a curve, that is further facilitated by the transverse link 16 which has a decided guiding action on the respective truck members. The elongated opening in the link 11 permits of relative longitudinal movement between the bumpers 9, and the hinged transverse link is adapted to restrain lateral movement between the truck members but permits of longitudinal and pivotal movement between the respective bumpers.

The relative movements between the trucks are essential in the chording of the cab with respect to the trucks when the latter are rounding a curve in order to maintain the center distance between the center bearings 5 of the truck members. This construction reduces, to a large extent, the thrust and resultant flange wear on the wheel.

Although I have described a specific embodiment of my invention, it will be obvious to those skilled in the art that various modifications may be made in the details of construction without departing from the principles herein set forth. For instance, the transverse link 16 may be provided with springs to permit of yielding lateral restraint and to increase or decrease the movement between the brackets 10.

I claim as my invention:—

1. A locomotive articulated truck hinge comprising a pair of co-operating bumpers, a longitudinally disposed link connecting said bumpers and a transverse link pivotally connected, at its respective ends, to supports associated with said bumpers.

2. A locomotive articulated truck hinge comprising a pair of co-operating bumpers, a longitudinally disposed link pivotally connected to said bumpers and a transverse link pivotally connected, at its respective ends, to supports associated with said bumpers.

3. A locomotive articulated truck hinge comprising a pair of co-operating bumpers, a longitudinally disposed link pivotally connected to said bumpers and a transverse link pivotally connected, at its respective ends, to supports associated with said bumpers, said longitudinal links having an elongated opening to permit of relative longitudinal movement of said bumpers.

4. A locomotive articulated truck hinge comprising a pair of co-operating bumpers, a plurality of longitudinally disposed links connecting said bumpers and a transverse link pivotally connected, at its respective ends, to supports associated with said bumpers.

5. A locomotive articulated truck hinge comprising a pair of co-operating bumpers, a plurality of longitudinally disposed links pivotally connected to said bumpers and a transverse link pivotally connected, at its respective ends, to supports associated with said bumpers, said longitudinal links having elongated openings to permit of relative longitudinal movement of said bumpers, and said transverse link being adapted to restrain lateral movement therebetween.

6. A locomotive articulated truck hinge comprising a pair of convex bumpers in co-operative alinement with each other, a plurality of connecting links pivotally mounted on said bumpers to permit relative longitudinal movement thereof and a transverse link pivotally connected, at its respective ends, to projecting supports associated with said bumpers.

7. A locomotive articulated truck hinge comprising a pair of convex bumpers in co-operative alinement with each other, means for providing relative longitudinal movement and pivotal movement therebetween, and means for restraining relative lateral movement thereof.

In testimony whereof, I have hereunto subscribed my name this 7th day of October, 1922.

NORMAN W. STORER.